J. P. JUBB.
Horseshoes.

No. 211,023.　　　Patented Dec. 17, 1878.

Witnesses:
J. W. Garner
W. S. D. Haines

Inventor:
Jno. P. Jubb,
per
F. A. Lehmann,
att'y.

UNITED STATES PATENT OFFICE.

JOHN P. JUBB, OF FAYETTE, MICHIGAN.

IMPROVEMENT IN HORSESHOES.

Specification forming part of Letters Patent No. 211,023, dated December 17, 1878; application filed October 19, 1878.

*To all whom it may concern:*

Be it known that I, JOHN P. JUBB, of Fayette, in the county of Delta and State of Michigan, have invented certain new and useful Improvements in Horseshoes; and I do hereby declare the following to be a full, clear, and exact description of the invention, such as will enable others skilled in the art to which it pertains to make and use it, reference being had to the accompanying drawings, which form part of this specification.

My invention relates to an improvement in horseshoes; and it consists in making a recess in the top of each end of the shoe, and incasing the rubber partially in a sheet-metal covering or jacket, and inserting the rubber thus protected in the recesses under the horse's heels, as will be more fully described hereinafter.

The accompanying drawings represent my invention.

Figure 1:
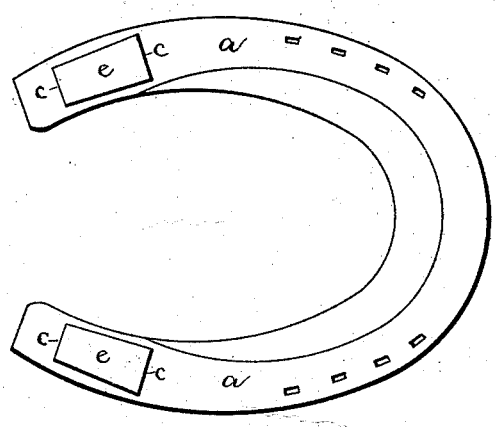
Figure 2:
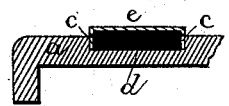
Figure 3:
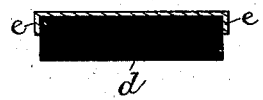

Figure 1 is a plan view of my shoe. Fig. 2 is a detail section, and Fig. 3 is a section of the spring and its cap.

$a$ represents a shoe, of any desired construction, having the recesses $c$ made in its top, near or at its rear ends. These recesses are made oblong in shape, preferably wider at its front end, and of any suitable depth, the rubber spring $d$ corresponding in shape to the recess, and of sufficient thickness to project some distance above the top of the shoe.

In order to protect the rubber from flattening out sidewise, and to keep it from becoming battered and worn, each one of the pieces of rubber has its top incased in a sheet-metal cap, $e$, as shown. This cap, fitting down over the top of the rubber, holds each spring compactly together; and as the lower half of the rubber is left free, any pressure upon the top of the cap will cause the spring to react vertically. As these springs are placed under each side of the heel of the foot, any pressure or percussion upon the foot comes upon the springs, and thus prevents any shock from coming upon the horse's leg.

Where the springs are not incased, as above described, all that portion of the spring that projects above the top of the shoe would be flattened out every time the weight of the horse was brought to bear upon it, and thus would be of little or no avail. By thus incasing the top of the spring the whole elasticity of the spring is utilized.

Many efforts have been made to use rubber springs in horseshoes, and I do not, therefore, broadly claim such.

Having thus described my invention, I claim—

A horseshoe, $a$, having recesses in the tops of its rear ends, in combination with the rubber springs $d$, having the inclosing-caps $e$, the said springs being made to project above the top of the shoe, so that the heel of the horse's foot will rest directly upon them, substantially as set forth.

In testimony that I claim the foregoing I have hereunto set my hand this 31st day of May, 1878.

JOHN P. JUBB.

Witnesses:
GEORGE D. HARRIS,
A. BERTMAN.